April 28, 1925.

A. L. HUGHES ET AL

MERCURY VAPOR TRAP

Filed Oct. 4, 1924

1,535,157

INVENTORS
Arthur Llewelyn Hughes
Franklin E. Poindexter

Patented Apr. 28, 1925.

1,535,157

UNITED STATES PATENT OFFICE.

ARTHUR LLEWELYN HUGHES AND FRANKLIN EMBRY POINDEXTER, OF ST. LOUIS, MISSOURI.

MERCURY-VAPOR TRAP.

Application filed October 4, 1924. Serial No. 741,689.

*To all whom it may concern:*

Be it known that we, ARTHUR LLEWELYN HUGHES, a subject of Great Britain, residing at 5945a McPherson Ave., in the city of St. Louis and State of Missouri, and FRANKLIN E. POINDEXTER, a citizen of the United States, residing at 3961a Lafayette Ave., in the city of St. Louis and State of Missouri, have invented new and useful Improvements in Mercury-Vapor Traps, for preventing mercury vapor from passing a given region or point in a highly exhausted apparatus, or apparatus containing gases at a low pressure.

In the process of evacuating radio tubes and many other types of apparatus, mercury pumps and gauges are often used. To prevent the diffusion of mercury vapor into the apparatus to be exhausted, either partially or completely, it has been the custom to place a trap consisting of a tube, or tubes, immersed in liquid air, in the system between the pumps and gauges on the one side and the apparatus to be exhausted on the other.

We have found that a chamber containing certain metals, preferably the alkali metals, such as lithium, sodium, potassium, rubidium or caesium which absorb mercury, serves the same purpose as the expensive liquid air and requires much less attention.

This chamber may have many forms, the only requirement being that the mercury vapor shall be exposed to the surface of the metal in its passage from the source of said vapor to the apparatus being exhausted.

Figure 1:
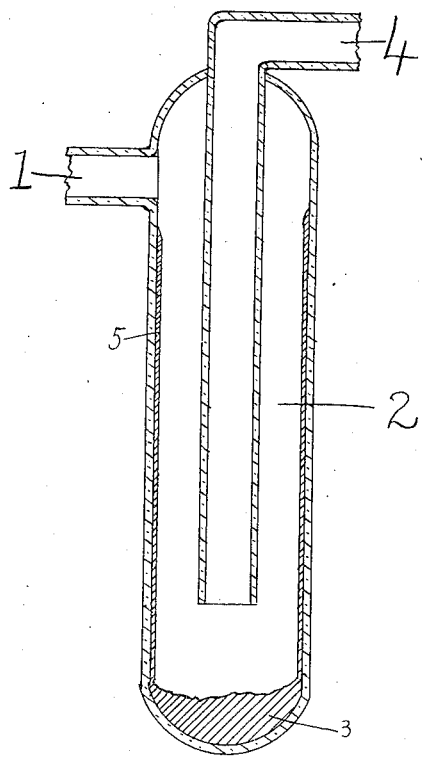
Figure 2:
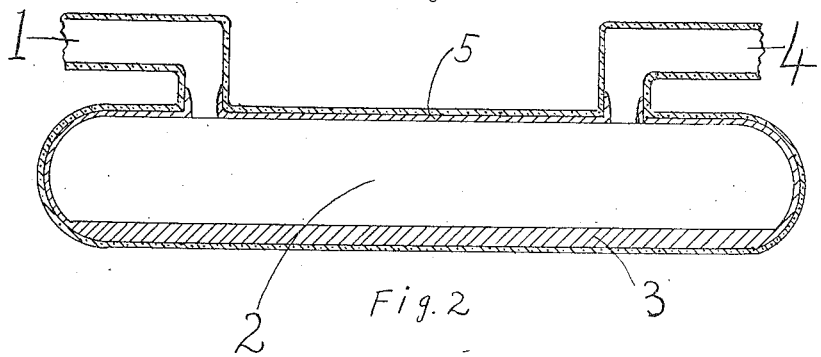

Two of these forms which the inventors have found suitable are the following:

In both Figures 1 and 2, the tube 1 (or 4) leads to the pumps and pressure gauges which serve as a source of mercury vapor and opens into chamber, 2, which contains the metal, 3. Tube 4 (or 1) leads to the apparatus from which it is desirable to withhold the mercury vapor. By the application of heat to the portion of the chamber containing the metal, this metal may be distilled upon the walls of said chamber, as shown at 5, Figs. 1 and 2, which will increase the area of the surface exposed to the mercury vapor and thus increase the rate of removal of said vapor. In case the chamber is of glass and it is desired to use an alkali metal which causes trouble by attacking the glass, a lining of metal or some substance not attacked by the alkali metal may be placed inside the chamber on which the alkali metal can be deposited.

We claim:

1. A mercury vapor trap containing an alkli metal.

2. A mercury vapor trap containing a substance which has the property of combining with mercury vapor and thus preventing the passage of the said vapor.

3. A mercury vapor trap containing a metal which has the property of reacting with and retaining mercury vapor.

4. A mercury vapor trap containing alkali metals.

ARTHUR LLEWELYN HUGHES.
FRANKLIN EMBRY POINDEXTER.